United States Patent
Natu et al.

(10) Patent No.: US 11,347,643 B2
(45) Date of Patent: May 31, 2022

(54) CONTROL LOGIC AND METHODS TO MAP HOST-MANAGED DEVICE MEMORY TO A SYSTEM ADDRESS SPACE

(71) Applicant: Intel Corporation, Santa Clara, CA (US)

(72) Inventors: Mahesh S. Natu, Folsom, CA (US); Vivekananthan Sanjeepan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 16/023,984

(22) Filed: Jun. 29, 2018

(65) Prior Publication Data

US 2019/0050335 A1    Feb. 14, 2019

(51) Int. Cl.
| | | |
|---|---|---|
| *G06F 12/0811* | (2016.01) | |
| *G06F 12/0875* | (2016.01) | |
| *G06F 9/4401* | (2018.01) | |
| *G06F 9/46* | (2006.01) | |
| *G06F 12/0893* | (2016.01) | |

(52) U.S. Cl.
CPC ........ *G06F 12/0811* (2013.01); *G06F 9/4411* (2013.01); *G06F 9/468* (2013.01); *G06F 12/0875* (2013.01); *G06F 12/0893* (2013.01)

(58) Field of Classification Search
CPC ............. G06F 12/0811; G06F 12/0875; G06F 9/4411; G06F 9/468; G06F 12/0893; G06F 12/10; G06F 12/0831
See application file for complete search history.

(56) References Cited

U.S. PATENT DOCUMENTS

| | | | |
|---|---|---|---|
| 9,501,408 B2 * | 11/2016 | Dusanapudi | ........ G06F 12/0815 |
| 2009/0024892 A1 * | 1/2009 | Bussa | .................... G06F 11/261 |
| | | | 714/738 |
| 2014/0236561 A1 * | 8/2014 | Dusanapudi | ........ G06F 12/0815 |
| | | | 703/14 |
| 2016/0344834 A1 * | 11/2016 | Das | ...................... G06F 11/3476 |
| 2019/0042240 A1 * | 2/2019 | Pappu | ................... G06F 3/0683 |
| 2019/0324681 A1 * | 10/2019 | Markow | ............. G06F 13/1673 |

* cited by examiner

*Primary Examiner* — Elias Mamo
(74) *Attorney, Agent, or Firm* — Alliance IP, LLC

(57) ABSTRACT

A system or a device can include a processor core comprising one or more hardware processors; a processor memory to cache data; a memory link interface to couple the processor core with one or more attached memory units; and a platform firmware to determine that a device is connected to the processor core across the memory link interface; determine that the device comprises an attached memory; determine a range of at least a portion of the attached memory available for the processor core; map the range of the portion of the attached memory to the processor memory; and wherein the processor core is to use the range of the portion of the attached memory and the processor memory to cache data.

27 Claims, 14 Drawing Sheets

DVSEC Register Block

| 31 | 16 | 15 | 0 | |
|---|---|---|---|---|
| PCIe Extended Capability Header ||||  00h |
| Designated Vendor-Specific Header 1 |||| 04h |
| Flex Bus Capability || Designated Vendor-Specific Header 2 || 08h |
| Flex Bus Status || Flex Bus Control || 0Ch |
| Flex Bus Status 2 || Flex Bus Control 2 || 10h |
| Reserved || Flex Bus Lock || 14h |
| Range 1 Size High |||| 18h |
| Range 1 Size Low |||| 1Ch |
| Range 1 Base High |||| 20h |
| Range 1 Base Low |||| 24h |
| Range 2 Size High |||| 28h |
| Range 2 Size Low |||| 2Ch |
| Range 2 Base High |||| 30h |
| Range 2 Base Low |||| 34h |

*FIG 15*

CONTROL LOGIC AND METHODS TO MAP HOST-MANAGED DEVICE MEMORY TO A SYSTEM ADDRESS SPACE

BACKGROUND

In computing, a cache is a component that stores data so future requests for that data can be served faster. For example, data stored in cache might be the result of an earlier computation, or the duplicate of data stored elsewhere. In general, a cache hit can occur when the requested data is found in cache, while a cache miss can occur when the requested data is not found in the cache. Cache hits are served by reading data from the cache, which typically is faster than recomputing a result or reading from a slower data store. Thus, an increase in efficiency can often be achieved by serving more requests from cache.

BRIEF DESCRIPTION OF THE DRAWINGS

FIG. 15 is an example Designated Vendor-Specific Extended Capability (DVSEC) register block according to embodiments of the present disclosure.

DETAILED DESCRIPTION

Figure 1:
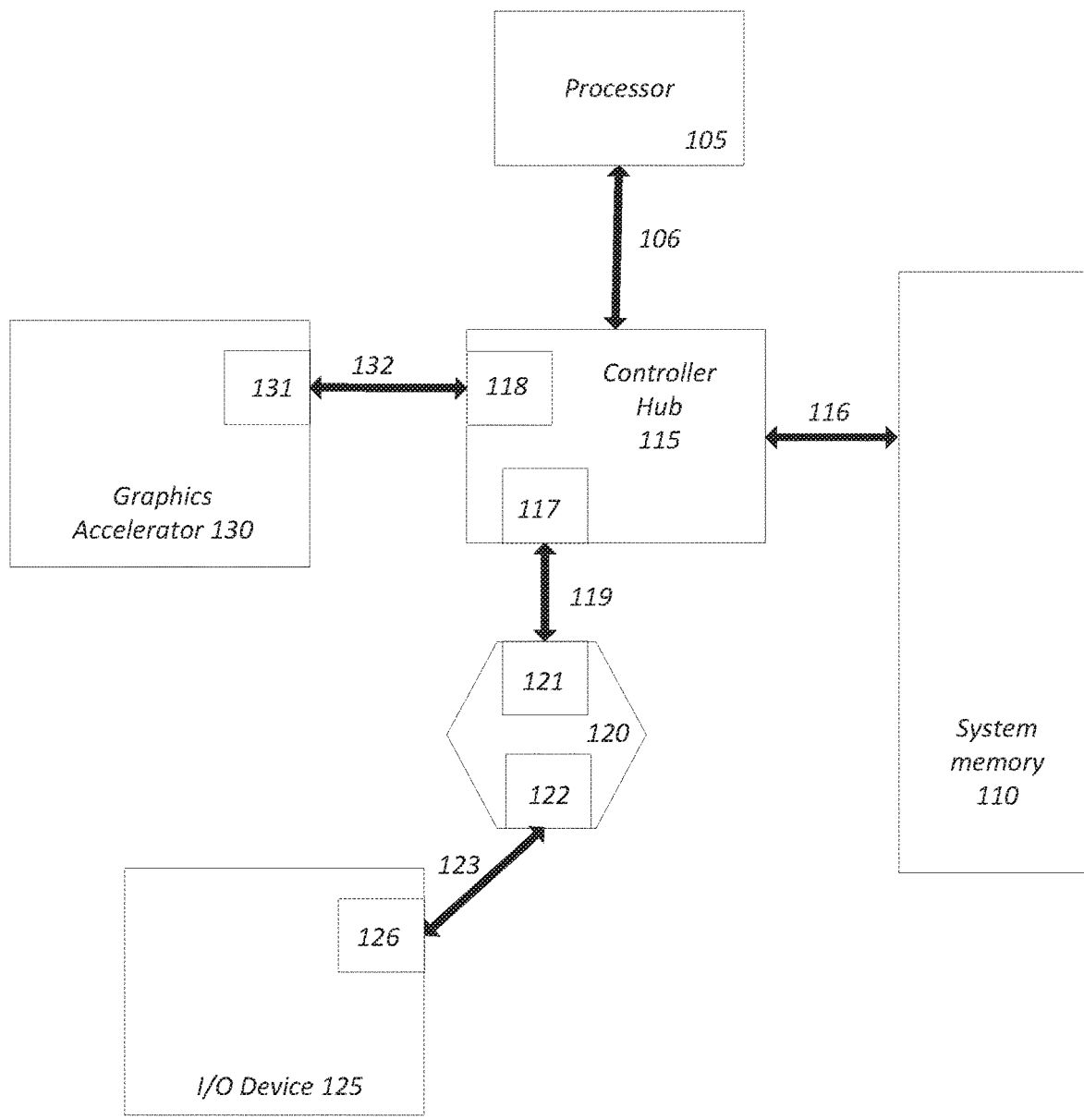
FIG. 1 is a schematic diagram of a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective markets. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 is coupled to I/O device 125 through serial link 123 and routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
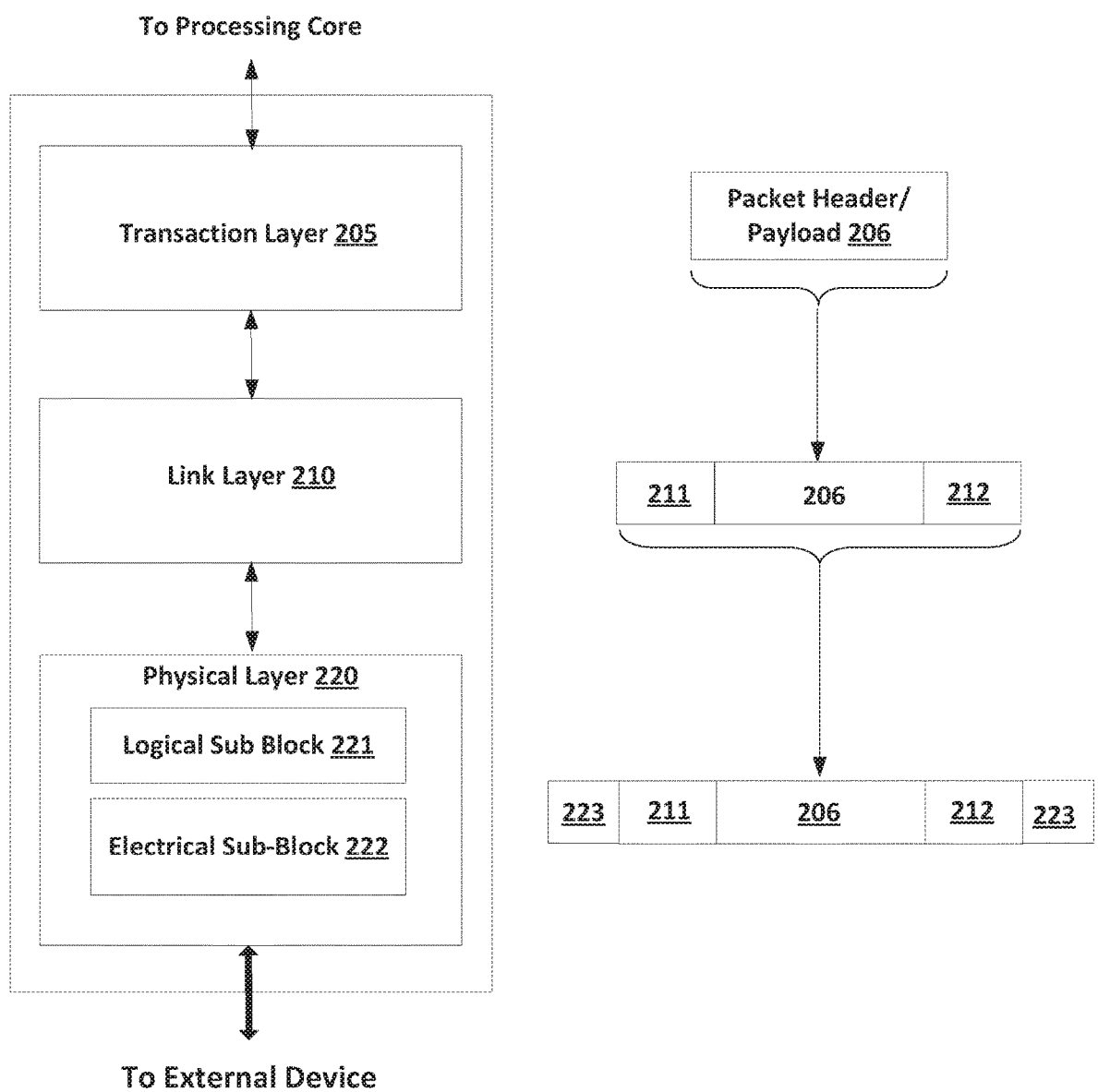
FIG. 2 is a schematic diagram of a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
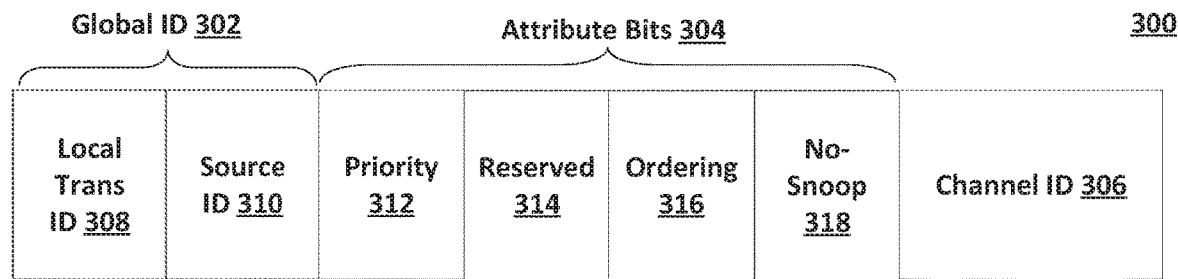
FIG. 3 is a schematic diagram of an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304, and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e., an identification number or packet number, calculates and applies an error detection code, i.e., CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 220. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8$b$/10$b$ transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
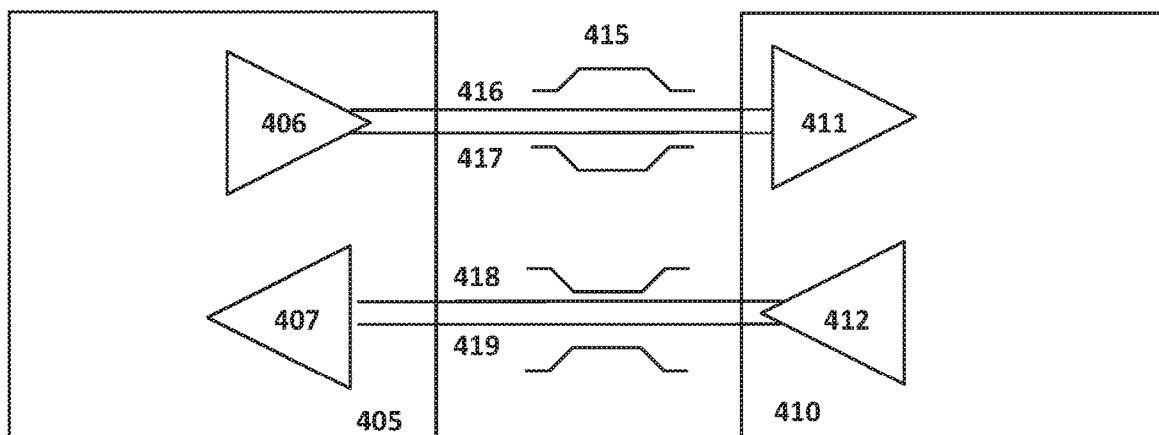
FIG. 4 is a schematic diagram of an embodiment of a serial point-to-point link.

Referring next to FIG. 4, an example embodiment of a serial point to point fabric is illustrated. A serial point-topoint link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

INTEL® accelerator Link (IAL) or other technologies (e.g. GenZ, CAPI) define a general purpose memory interface that allows memory associated with a discrete device, such as an accelerator, to serve as coherent memory. In many cases, the discrete device and associated memory may be a connected card or in a separate chassis from the core processor(s). The result of the introduction of device-associated coherent memory is that device memory is not tightly coupled with the CPU or platform. Platform specific firmware cannot be expected to be aware of the device details. For modularity and interoperability reasons, memory initialization responsibilities must be fairly divided between platform specific firmware and device specific firmware/software.

This disclosure defines memory initialization flows and architectural interfaces that allow device specific firmware/software to abstract device specific initialization steps from the platform firmware. It provides device vendors significant flexibility regarding which device specific entity performs memory initialization. Initialization can either be performed by a dedicated microcontroller on the device, device pre-boot unified extensible firmware interface (UEFI) firmware or a post-operating system (OS) device driver.

This disclosure uses IAL attached memory (IAL.mem protocol) as an example implementation, but can be extended to other technologies as well, such as those proliferated by the GenZ consortium or the CAPI or OpenCAPI specification. The IAL builds on top of PCIe and adds support for coherent memory attachment. In general, however, the systems, devices, and programs described herein can use other types of input/output buses that facilitate the attachment of coherent memory.

Figure 5:
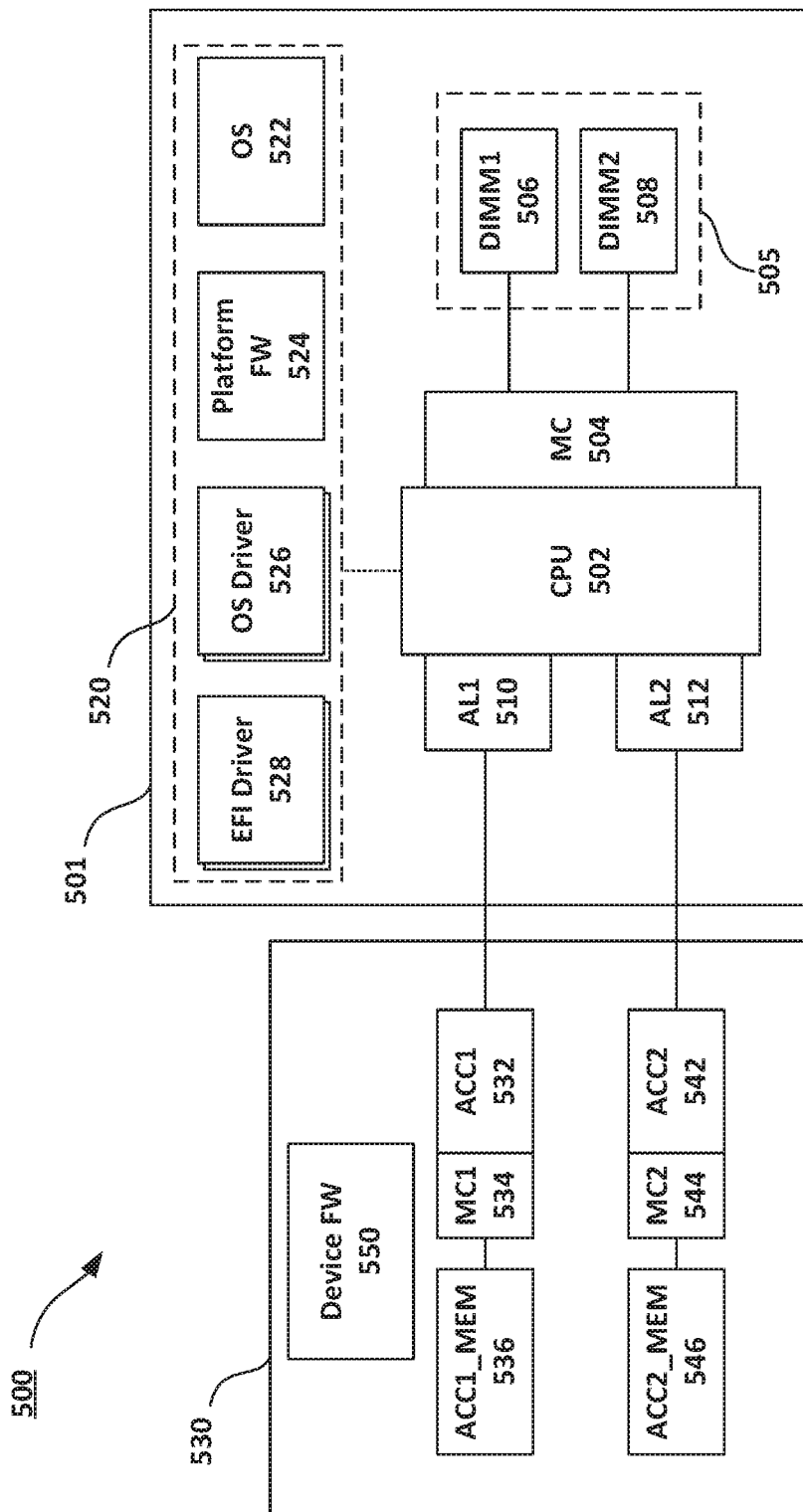
FIG. 5 is a schematic diagram of a processing system that includes a connected accelerator in accordance with embodiments of the present disclosure.

FIG. 5 is a schematic diagram of a processing system 500 that includes a connected accelerator in accordance with embodiments of the present disclosure. The processing system 500 can include a host processor 501 and a connected device 530. The connected device 530 can be a discrete device connected across a IAL-based interconnect, or by another similar interconnect. The connected device 530 can be integrated within a same chassis as the host processor 501 or can be housed in a separate chassis.

The host processor 501 can include a processor core 502 (labelled as CPU 502). The processor core 502 can include one or more hardware processors. The processor core 502 can be coupled to memory module 505. The memory module 505 can include double data rate (DDR) interleaved memory, such as dual in-line memory modules DIMM1 506 and DIMM2 508, but can include more memory and/or other types of memory, as well. The host processor 501 can include a memory controller 504 implemented in one or a combination of hardware, software, or firmware. The memory controller 504 can include logic circuitry to manage the flow of data going to and from the host processor 501 and the memory module 505.

A connected device 530 can be coupled to the host processor 501 across an interconnect. As an example, the connected device 530 can include accelerators ACC1 532 and ACC2 542. ACC1 532 can include a memory controller MC1 534 that can control a coherent memory ACC1_MEM 536. ACC2 542 can include a memory controller MC2 544 that can control a coherent memory ACC2_MEM 546. The connected device 530 can include further accelerators, memories, etc. ACC1_MEM 536 and ACC2_MEM 546 can be coherent memory that is used by the host processor; likewise, the memory module 505 can also be coherent memory. ACC1_MEM 536 and ACC2_MEM 546 can be or include host-managed device memory (HDM).

The host processor 501 can include software modules 520 for performing one or more memory initialization procedures. The software modules 520 can include an operating system (OS) 522, platform firmware (FW) 524, one or more OS drivers 526, and one or more EFI drivers 528. The software modules 520 can include logic embodied on non-transitory machine readable media, and can include instructions that when executed cause the one or more software modules to initialize the coherent memory ACC1_MEM 536 and ACC2_MEM 546.

For example, platform firmware 524 can determine the size of coherent memory ACC1_MEM 536 and ACC2_MEM 546 and gross characteristics of memory early during boot-up via standard hardware registers or using Designated Vendor-Specific Extended Capability Register (DVSEC). Platform firmware 524 maps device memory ACC1_MEM 536 and ACC2_MEM 546 into coherent address spaces. Device firmware or software 550 performs device memory initialization and signals platform firmware 524 and/or system software 520 (e.g., OS 522). Device firmware 550 then communicates detailed memory characteristics to platform firmware 524 and/or system software 520 (e.g., OS 522) via software protocol.

Figure 6:
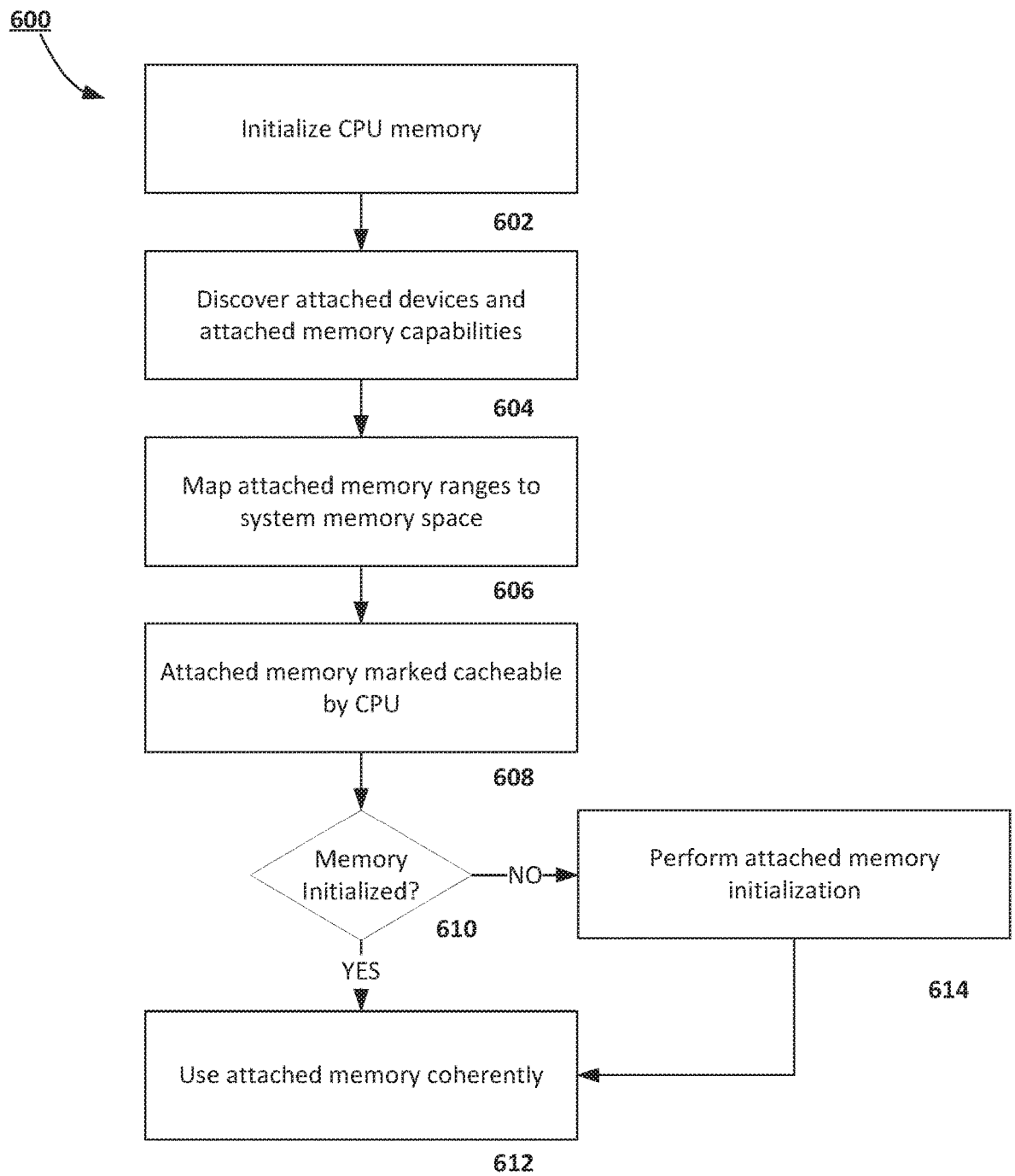
FIG. 6 is a process flow diagram for discovery of attached coherent memory in accordance with embodiments of the present disclosure.

FIG. 6 is a process flow diagram 600 for discovery of attached coherent memory in accordance with embodiments of the present disclosure. The following procedure can be performed at boot-up of the computing system by platform firmware or other software modules. At boot-up, the platform FW can initialize the memory associated with the host processor core (CPU) (602).

The platform firmware would then discover attached devices and the memory capabilities of memory associated with the attached devices (referred to here as attached memory) (604). For example, for an attached device that supports IAL.mem, the connected device can implement host-managed device memory (HDM). HDM memory is coherent with the host system. Platform firmware can determine how many host-managed device memory (HDM) ranges are implemented by the device and determine size of each of the HDM ranges.

The platform firmware can use information provided by the device to determine the memory capabilities of the device. For example, an IAL protocol-based link can expose a connected PCIe device or function. The PCIe device/function carries a Designated Vendor-Specific Extended Capability (DVSEC) register block. An example of a DVSEC register block is provided in FIG. 15.

Various HDM related register fields are described below.

Flex Capability: Reports Device Capabilities

| Bit | Attributes | Description |
|---|---|---|
| 5:4 | RO | HDM_Count: Number of HDM ranges implemented by the Intel AL device and reported through this function.<br>00 - Zero ranges. This setting is illegal if Intel AL.Mem Capable = 1.<br>01 - One HDM range.<br>10 - Two HDM ranges.<br>11 - Reserved<br>This field must return 00 if Intel AL.mem Capable = 0. |
| 3 | RO | Mem_HwInit_Mode: If set, indicates this Intel AL.mem capable device initializes memory with assistance from hardware and firmware located on the device. If clear, indicates memory is initialized by host software such as device driver. This bit should be ignored if Intel AL.mem Capable = 0. |
| 2 | RO | Mem_Capable: If set, indicates Intel AL.mem protocol support when operating in Intel Flex Bus.AL mode. |

Flex Bus Lock

| Bit | Attributes | Description |
|---|---|---|
| 0 | RWO | CONFIG_LOCK: When set, control register, Memory Base Low and Memory Base High registers become read only. |

Flex Control

| Bit | Attributes | Description |
|---|---|---|
| 2 | RWL | Mem_Enable: When set, enables Intel AL.mem protocol operation when in Intel Flex Bus.AL mode. Locked by CONFIG_LOCK. |

Flex Bus Range Size High (1-2 copies)

| Bit | Attributes | Description |
|---|---|---|
| 31:0 | RO | Memory_Size_High: Corresponds to bits 63:32 of Intel Flex Bus Range memory size. |

Flex Bus Range Size Low (1-2 copies)

| Bit | Attributes | Description |
|---|---|---|
| 31:20 | RO | Memory_Size_Low: Corresponds to bits 31:20 of Intel Flex Bus Range memory size. |
| 19:10 | N/A | Reserved (RSVD). |
| 9:7 | RO | Desired_Interleave: If an Intel AL.mem capable device is connected to a single CPU via multiple Flex Bus links, this field represents the memory interleaving desired by the device. BIOS will configure the CPU to interleave accesses to this HDM range across links at this granularity.<br>00 - No Interleave<br>01 - 256 Byte Granularity<br>10 - 4K Interleave<br>all other settings are reserved |

| Bit | Attributes | Description |
|---|---|---|
| 6:4 | RO | Memory_Class: Indicates the class of memory<br>000 - Memory Class (e.g. normal DRAM)<br>001 - Storage Class (e.g. Intel 3DXP(r))<br>All other encodings are reserved. |
| 3:1 | RO | Media_Type: Indicates the memory media characteristics<br>000 - Volatile memory<br>001 - Non-volatile memory<br>Other encodings are reserved. |
| 1 | RO | Memory_Active: When set, indicates that the Intel Flex Bus Range memory is fully initialized and available for software use. Must be set within 1 second of deassertion of reset to Intel AL device if Intel AL.mem HwInit Mode = 1. Can be indirectly set by device firmware/software by writing a device specific register. |
| 0 | RO | Memory_Info_Valid: When set, indicates that the Intel Flex Bus Range Size high and Size Low registers are valid. Must be set within 1 second of deassertion of reset to Intel AL device. |

Flex Bus Range Base High (1-2 copies)

| Bit | Attributes | Description |
|---|---|---|
| 31:0 | RWL | Memory_Base_High: Corresponds to bits 63:32 of Intel Flex Bus Range base in the host address space. Configured by system BIOS. |

Flex Bus Range Base Low (1-2 copies)

| Bit | Attributes | Description |
|---|---|---|
| 31:20 | RWL | Memory_Base_Low: Corresponds to bits 31:20 of Intel Flex Bus Range base in the host address space. |
| 19:0 | N/A | Reserved (RSVD). |

An IAL.mem capable device directs host accesses to an address A its local HDM memory if the following two equations are satisfied:

Memory_Base[63:20]<=(A<<20)<Memory_Base[63:20]+Memory_Size[63:20]

Memory_Active AND Mem_Enable=1

Once the HDM ranges and memory sizes are determined, the platform firmware can map the HDM ranges onto system memory space with the CPU attached memory (606). Platform firmware describes device memory sizes and locality information to OS via Advanced Configuration and Power Interface (ACPI) Static Resource Affinity Table (SRAT) and heterogeneous memory attribute table (HMAT) entries. Platform firmware combines the HMAT fragment tables produced by device EFI driver with the platform information and builds the ACPI HMAT tables for OS consumption. Referring back to FIG. 5, FIG. 5 illustrates two accelerators, namely ACC1 532 and ACC2 542, that are attached to CPU 502 via accelerator links 510 and 512, respectively. Accelerator links 510 and 512 can be IAL, GenZ, CAPI, or other protocol-based links. The CPU 502 also has a local memory controller 504 with DIMM1 506 and DIMM2 508 connected to the CPU 502 across two channels.

To construct the ACPI HMAT, the platform firmware 524 combines the information it has about the CPU 502 and various CPU links with what it learns about the accelerator memory 536 and 546 from accelerator EFI drivers 528. An example is provided below:

Information known to platform firmware:

DIMM1 506, DIMM2 508 size=128 GB;

DDR Read/Write Latency=50 ns;

DDR Read/Write Bandwidth=20 GB/s/CH;

Intel AL 510, 512 Latency=40 ns;

Intel AL 510, 512 Bandwidth=30 GB/s;

The Intel AL 510, 512 topology.

Information exposed by ACC1 532 EFI driver via HMAT fragment:

ACC1.MEM 536 size=16 GB;

ACC1.MEM 536 Read/Write latency=60 ns;

ACC1.MEM 536 Read/Write bandwidth=80 GB/s.

Information exposed by ACC2 542 EFI driver via HMAT fragment:

ACC2.MEM 546 size=8 GB;

ACC2.MEM 546 Read/Write latency=60 ns;

ACC2.MEM 546 Read/Write bandwidth=80 GB/s.

Platform firmware 524 combines these data together to construct the various ACPI tables. Examples of the ACPI tables are shown in below. HMAT table consists of System Locality Latency and Bandwidth Information Structure and memory Subsystem Address Range Structures.

TABLE 2

Example SRAT

| Proximity Domain | Type | SPA Base | Length | Note: Interleave Set |
|---|---|---|---|---|
| 0 | Processor | | CPU APIC IDs | |
| 0 | Memory | 0 | 256 GB | DIMM1, DIMM2 |
| 1 | Memory | 256 GB | 16 GB | ACC1.MEM |
| 2 | Memory | 272 GB | 8 GB | ACC2.MEM |

| Scope | (_PXM) |
|---|---|
| _SB.PCI.ACC1 | 1 |
| _SB.PCI.ACC2 | 2 |

| Scope | (PXM) |
|---|---|
| _SB.PCI.ACC1 | 1 |
| _SB.PCI.ACC2 | 2 |

TABLE 3

Example Memory Subsystem Address Range Structure
Memory Subsystem Address Range Structure

| Flags | SPA Base | Length | Processor PD | Memory PD |
|---|---|---|---|---|
| PPD Valid | 0 | 256 GB | 0 | |
| MPD Valid | 32 GB | 32 GB | | 1 |
| MPD Valid | 64 GB | 32 GB | | 2 |

PD = Proximity Domain;
PPD = Processor PD;
MPD = Memory PD.

TABLE 4

System Locality Latency and Bandwidth Information Structure
System Locality Latency and Bandwidth Information Structure

| Flags | Data Type | No. of Initiator PDs | Number of Target PDs | Entry Base Unit (base 10) |
|---|---|---|---|---|
| Memory | ACC Latency | 3 | 3 | 1 ns |
| Memory | Bandwidth | 3 | 3 | 1024 MB |

The processor and the local memory is part of the same non-uniform memory access (NUMA) node (known as "proximity domain" in ACPI spec). Each accelerator is associated with a separate, memory only NUMA node. These are listed in ACPI SRAT table. The size fields are set to 0 and NUMA node is marked as disabled if the memory is uninitialized at the time of OS hand-off. In this case, OS driver is responsible for initializing device memory and notifying OS.

Similar to other PCIe devices, _PXM method can be used to identify proximity between the accelerator PCIe function and the accelerator NUMA node.

System BIOS computes CPU to accelerator memory latency by adding Intel AL latency and local memory access latency. Link latency is known to system BIOS and accelerator side latency is reported by the accelerator EFI driver via HMAT fragment. Row 0 and column 2 in the latency table shows a sample calculation.

CPU to accelerator memory bandwidth is equal to the Intel AL Bandwidth or local memory bandwidth, whichever is lower. Intel AL bandwidth is known to system BIOS and accelerator side bandwidth is reported by accelerator EFI driver via HMAT fragment.

The platform firmware can indicate that device memory is cacheable by processor (608). The platform firmware can determine whether the attached memory is initialized (610). The DVSEC register block can include a field indicating a memory initialization mode: Mem_HwInit_Mode: If Mem_HwInit_Mode=1, the device memory is already initialized and can be used. If Mem_HwInit_Mode=0, device memory initialization is performed (614). The attached memory can be accessed as coherent memory (612) by the host processor 502 even though it cannot be used for storing code/data if MEM_Active=0.

Figure 7:
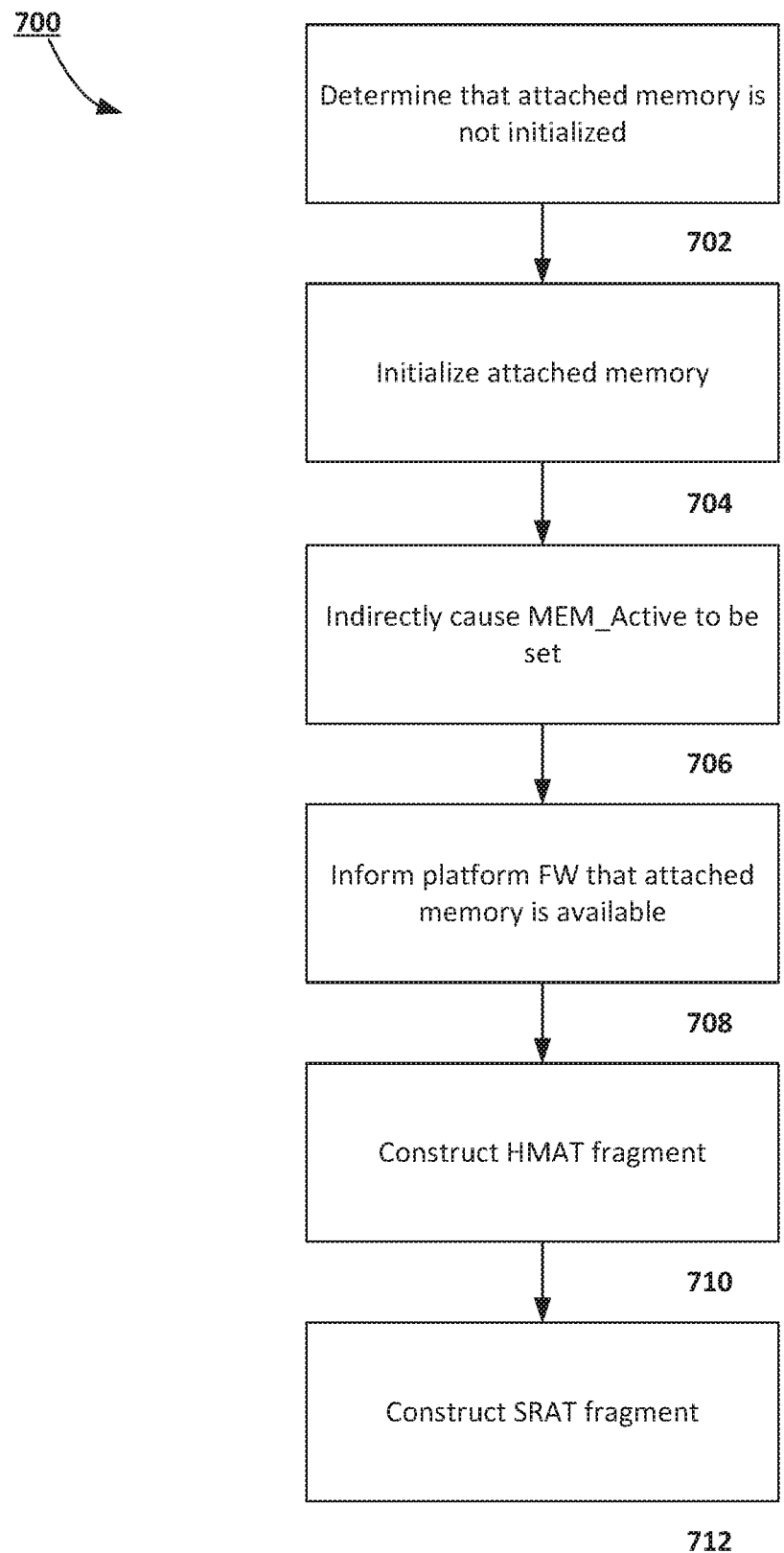
FIG. 7 is a process flow diagram for initialization of attached coherent memory in accordance with embodiments of the present disclosure.

FIG. 7 is a process flow diagram 700 for initialization of attached coherent memory in accordance with embodiments of the present disclosure. The initialization procedure can be performed by a device EFI driver or OS driver. Until attached memory initialization occurs, the memory ranges are tracked as "firmware reserved memory" by UEFI firmware. The device is responsible for returning all 1s on reads and dropping writes to the HDM ranges.

At the outset, the platform firmware determines that the attached memory is not initialized (e.g., by reading a Mem_HwInit_Mode=0 from a DVSEC field) (702). A device driver can initialize the attached memory using device-specific information for initialization processes inherent to the device driver or read from device or system fields (704). The driver can indirectly cause the Mem_Active field to be set (706). The driver indirectly causes the Mem_Active field to be set by setting one or more other fields that prompts the device hardware to set the Mem_Active field.

The driver can then notify the platform firmware that the attached memory is available for caching using a software call (708). For example, the EFI driver can invoke Set- MemorySpaceAttributes( ) function defined in the UEFI Platform Initialization Specification or an equivalent function. As another example, the OS driver can invoke ACPI_DSM (device-specific method). The ACPI_DSM procedure can notify OS memory manager about the additional available memory via mechanisms and flows such as dynamic hardware partitioning protocols for OS drivers.

In certain implementations of the embodiments, an EFI driver can perform attached memory initialization. The EFI driver can provide information to the platform firmware that allows the platform firmware to construct the memory map, including constructing a HMAT fragment (710) and SRAT fragment (712) as described above.

Figure 8:
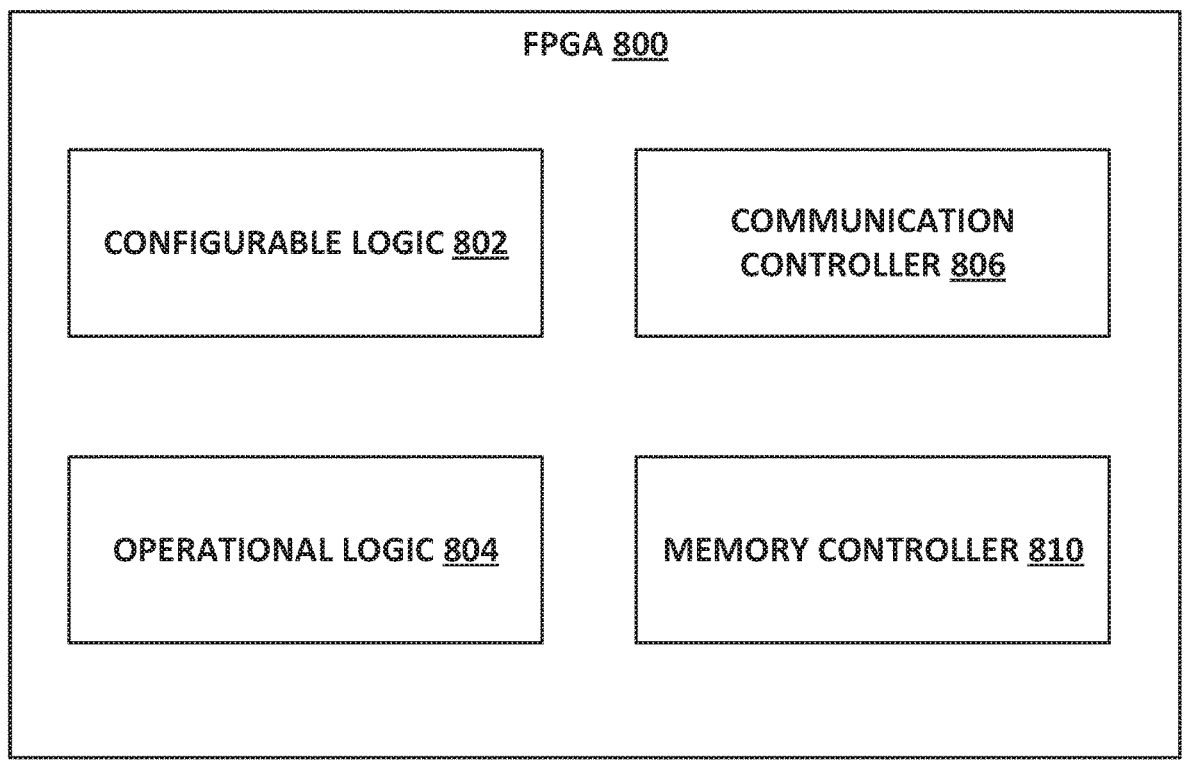
FIG. 8 is a schematic diagram of an example embodiment of a field programmable gate array (FGPA) in accordance with certain embodiments.

FIG. 8 illustrates a field programmable gate array (FGPA) 800 in accordance with certain embodiments. In a particular embodiment, functionality of the platform firmware 524 may be implemented by circuitry of operational logic 804). An FPGA may be a semiconductor device that includes configurable logic. An FPGA may be programmed via a data structure (e.g., a bitstream) having any suitable format that defines how the logic of the FPGA is to be configured. An FPGA may be reprogrammed any number of times after the FPGA is manufactured.

In the depicted embodiment, FPGA 800 includes configurable logic 802, operational logic 804, communication controller 806, and memory controller 810. Configurable logic 802 may be programmed to implement one or more kernels. A kernel may comprise configured logic of the FPGA that may receive a set of one or more inputs, process the set of inputs using the configured logic, and provide a set of one or more outputs. The kernel may perform any suitable type of processing. In various embodiments, a kernel may comprise a prefix decoder engine. Some FPGAs 800 may be limited to executing a single kernel at a time while other FPGAs may be capable of executing multiple kernels simultaneously. The configurable logic 802 may include any suitable logic, such as any suitable type of logic gates (e.g., AND gates, XOR gates) or combinations of logic gates (e.g., flip flops, look up tables, adders, multipliers, multiplexers, demultiplexers). In some embodiments, the logic is configured (at least in part) through programmable interconnects between logic components of the FPGA.

Operational logic 804 may access a data structure defining a kernel and configure the configurable logic 802 based on the data structure and perform other operations of the FPGA. In some embodiments, operational logic 804 may write control bits to memory (e.g., nonvolatile flash memory or SRAM based memory) of the FPGA 800 based on the data structure, wherein the control bits operate to configure the logic (e.g., by activating or deactivating particular interconnects between portions of the configurable logic). The operational logic 804 may include any suitable logic (which may be implemented in configurable logic or fixed logic), such as one or more memory devices including any suitable type of memory (e.g., random access memory (RAM)), one or more transceivers, clocking circuitry, one or more processors located on the FPGA, one or more controllers, or other suitable logic.

Communication controller 806 may enable FPGA 800 to communicate with other components (e.g., a compression engine) of a computer system (e.g., to receive commands to compress data sets). Memory controller 810 may enable the FPGA to read data (e.g., operands or results) from or write data to memory of a computer system. In various embodiments, memory controller 810 may comprise a direct memory access (DMA) controller.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9:
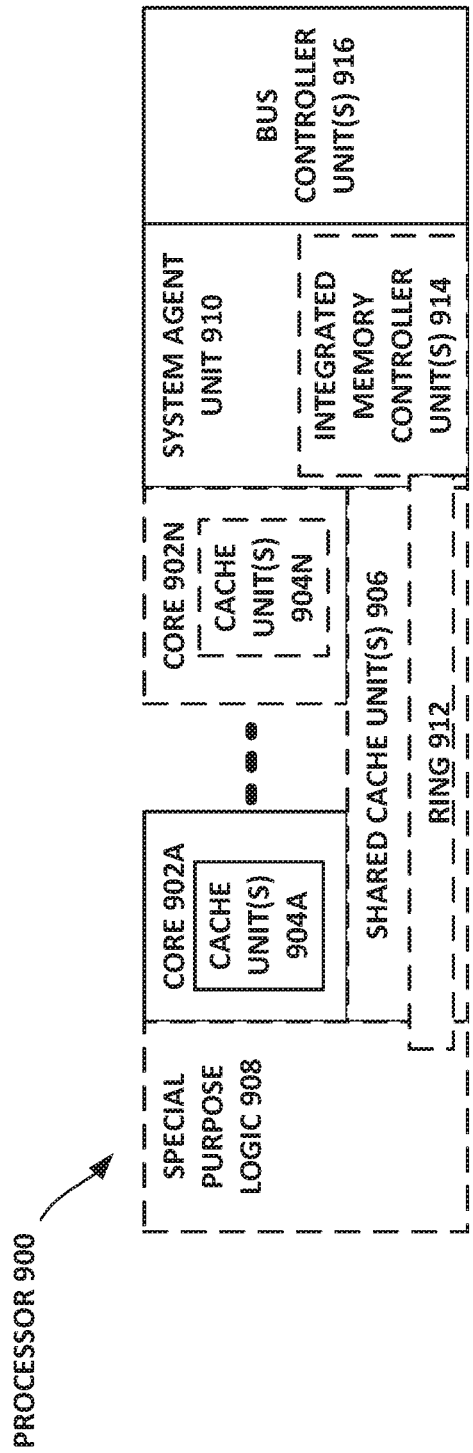
FIG. 9 is a block diagram of a processor 900 that may have more than one core, may have an integrated memory controller, and may have integrated graphics according to various embodiments.

FIG. 9 is a block diagram of a processor 900 that may have more than one core, may have an integrated memory controller, and may have integrated graphics according to various embodiments. The solid lined boxes in FIG. 9 illustrate a processor 900 with a single core 902A, a system agent 910, and a set of one or more bus controller units 916; while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 900 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores 904A-N, a set of one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic (e.g., integrated graphics logic) 908, the set of shared cache units 906, and the system agent unit 910/integrated memory controller unit(s) 914, alternative embodiments may use any number of well-known techniques for interconnecting such units. In one embodiment, coherency is maintained between one or more shared cache units 906 and cores 902A-N.

In some embodiments, one or more of the cores 902A-N are capable of multi-threading. The system agent unit 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

FIGS. 10-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 10:
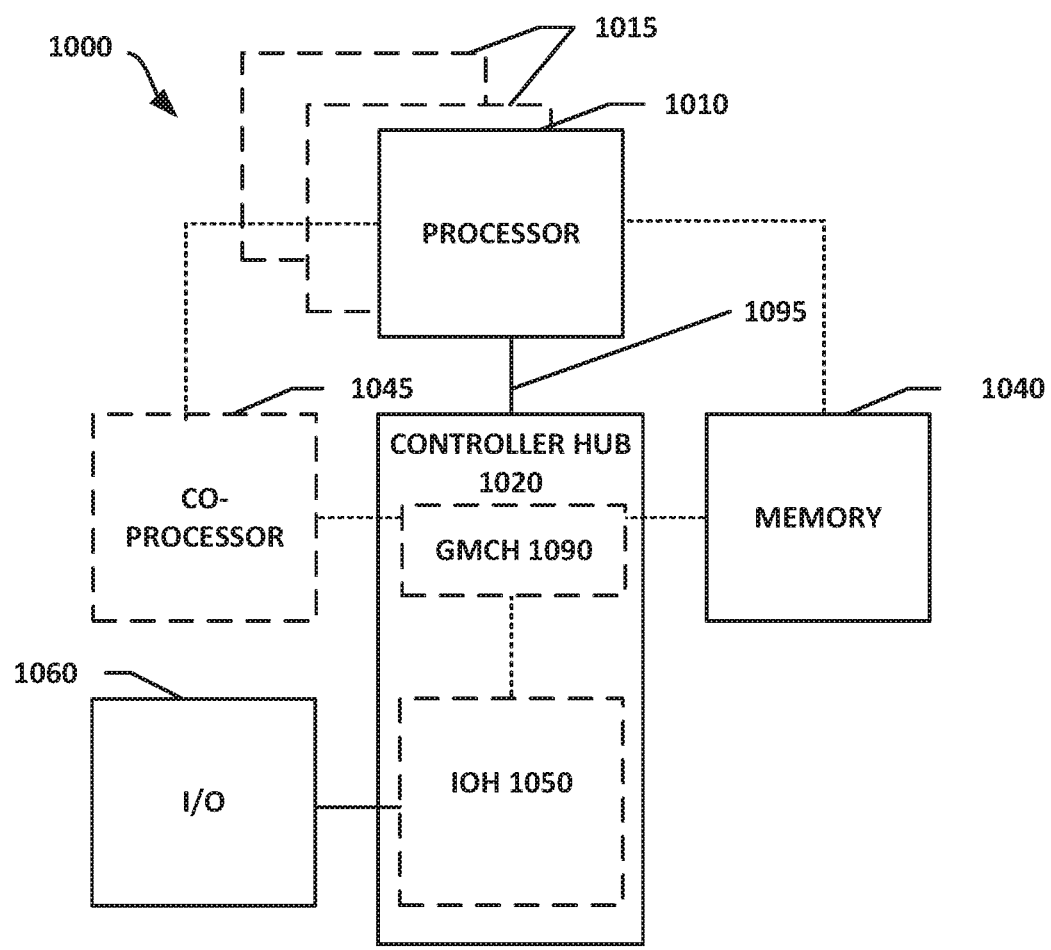
FIG. 10 depicts a block diagram of a system 1000 in accordance with one embodiment of the present disclosure.

FIG. 10 depicts a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips or the same chip); the GMCH 1090 includes memory and graphics controllers coupled to memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 is a single chip comprising the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), other suitable memory, or any combination thereof. The memory 1040 may store any suitable data, such as data used by processors 1010, 1015 to provide the functionality of computer system 1000. For example, data associated with programs that are executed or files accessed by processors 1010, 1015 may be stored in memory 1040. In various embodiments, memory 1040 may store data and/or sequences of instructions that are used or executed by processors 1010, 1015.

In at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression and/or decompression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
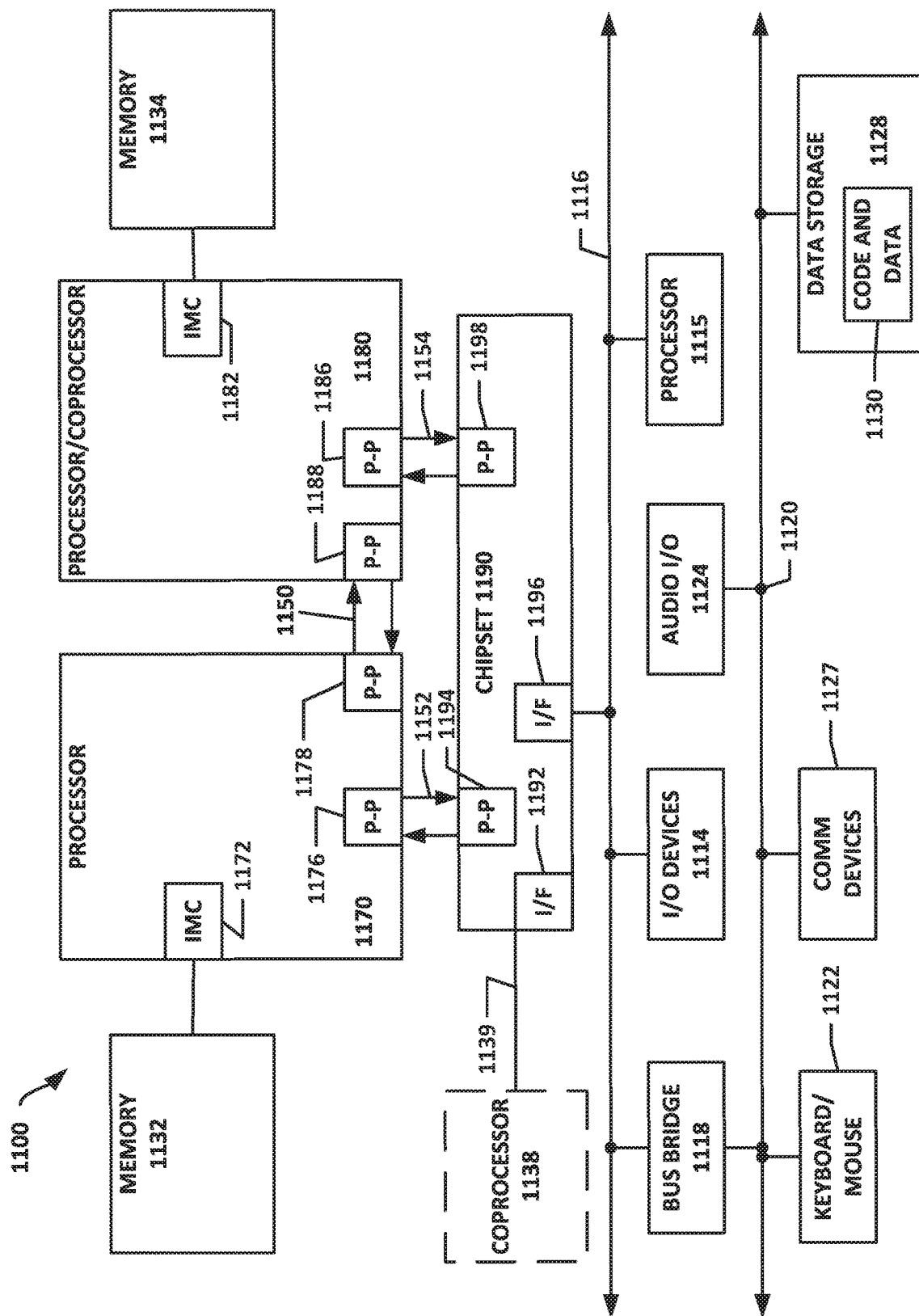
FIG. 11 depicts a block diagram of a first more specific exemplary system 1100 in accordance with an embodiment of the present disclosure.

FIG. 11 depicts a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 1000. In one embodiment of the disclosure, processors 1170 and 1180 are respectively processors 1110 and 1115, while coprocessor 1138 is coprocessor 1145. In another embodiment, processors 1170 and 1180 are respectively processor 1110 and coprocessor 1145.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139 using point to point interface circuit 1192. In one embodiment, the coprocessor 1138 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are contemplated by this disclosure. For example, instead of the point-to-point architecture of FIG. 11, a system may implement a multi-drop bus or other such architecture.

Figure 12:
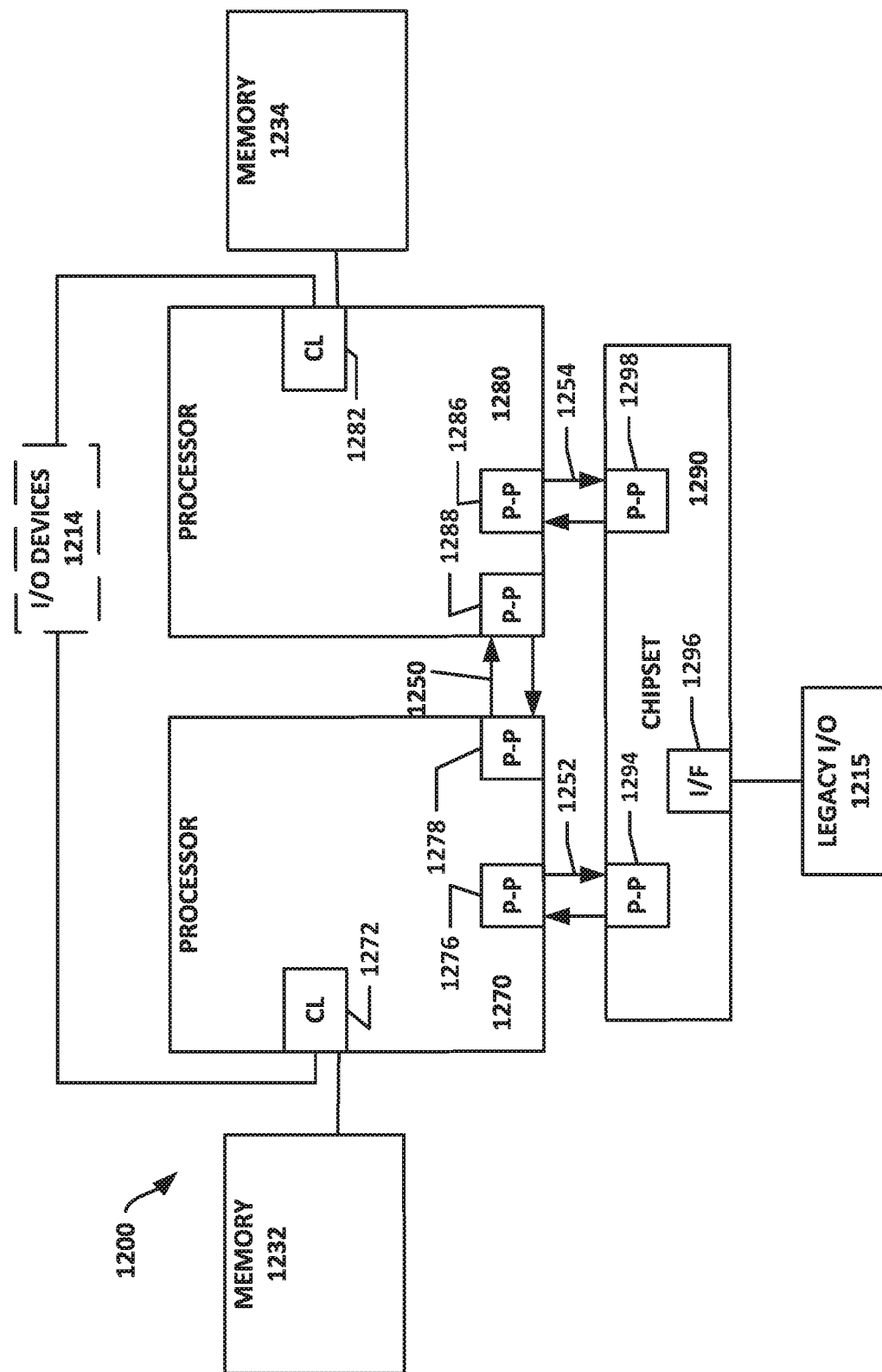
FIG. 12 depicts a block diagram of a second more specific exemplary system 1300 in accordance with an embodiment of the present disclosure.

FIG. 12 depicts a block diagram of a second more specific exemplary system 1200 in accordance with an embodiment of the present disclosure. Similar elements in FIGS. 11 and 12 bear similar reference numerals, and certain aspects of FIG. 11 have been omitted from FIG. 12 in order to avoid obscuring other aspects of FIG. 12.

FIG. 12 illustrates that the processors 1270, 1280 may include integrated memory and I/O control logic ("CL") 1272 and 1282, respectively. Thus, the CL 1272, 1282 include integrated memory controller units and include I/O control logic. FIG. 12 illustrates that not only are the memories 1232, 1234 coupled to the CL 1272, 1282, but also that I/O devices 1214 are also coupled to the control logic 1272, 1282. Legacy I/O devices 1215 are coupled to the chipset 1290.

Figure 13:
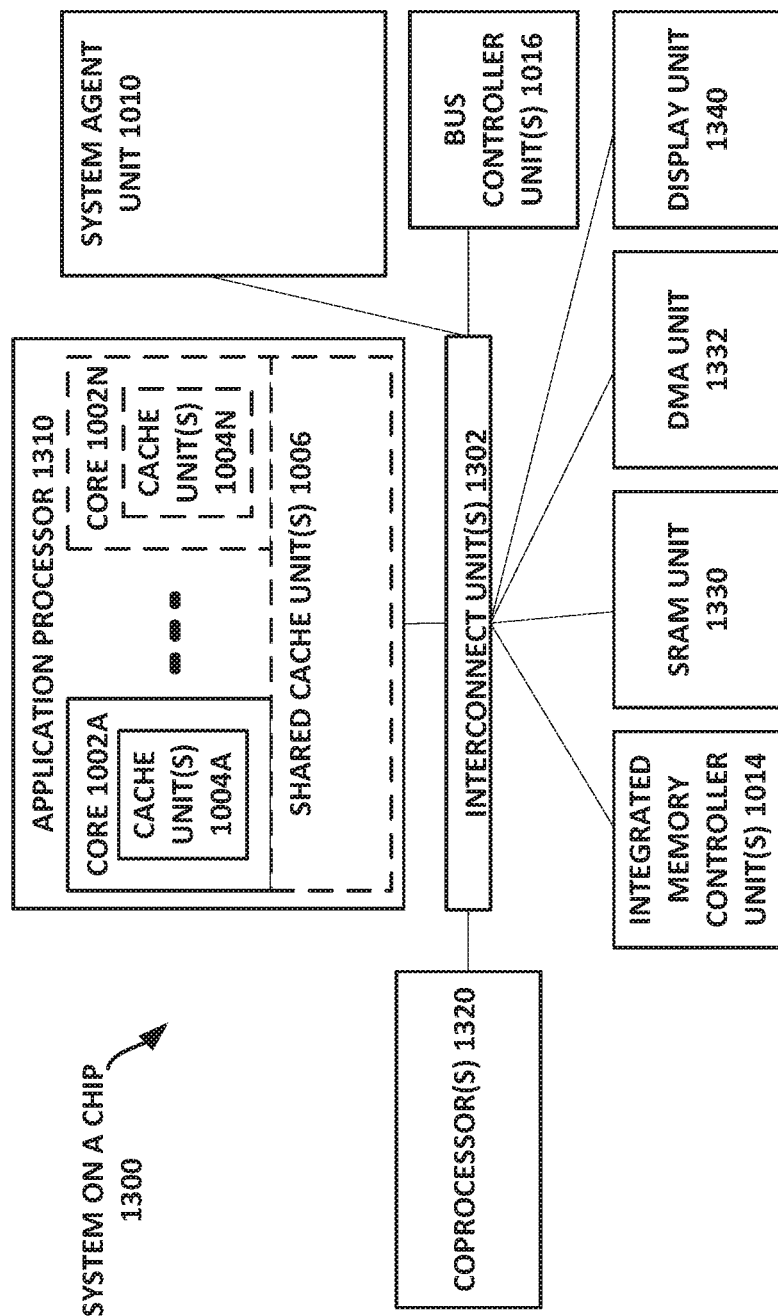
FIG. 13 depicts a block diagram of a SoC in accordance with an embodiment of the present disclosure.

FIG. 13 depicts a block diagram of a SoC 1300 in accordance with an embodiment of the present disclosure. Also, dashed lined boxes are optional features on more advanced SoCs. In FIG. 13, an interconnect unit(s) 1302 is coupled to: an application processor 1310 (which includes a set of one or more cores 1002A-N (with cache units 1004A-N) and shared cache unit(s) 1006); a system agent unit 1010; a bus controller unit(s) 1016; an integrated memory controller unit(s) 1014; a set of one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
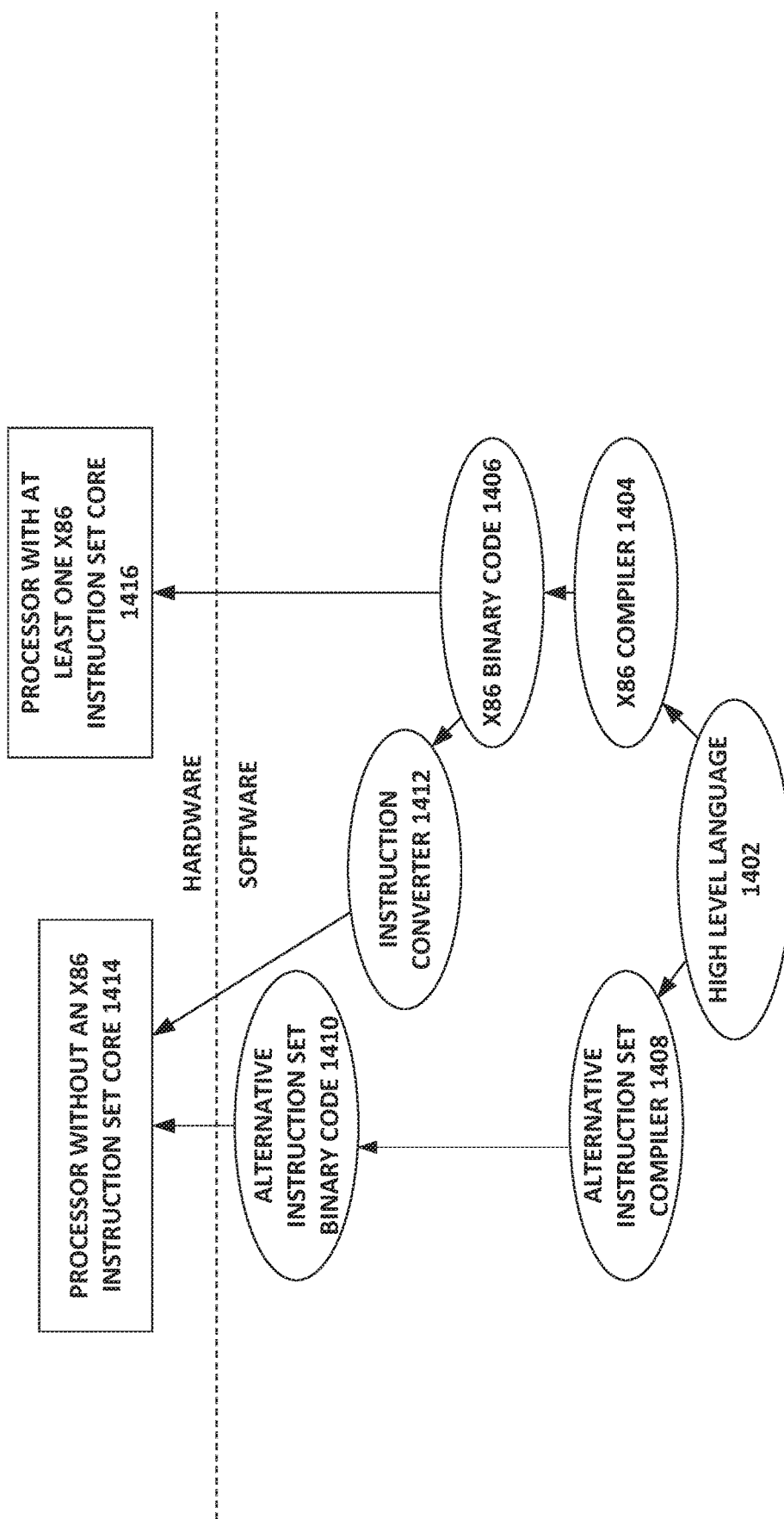
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The systems, methods, computer program products, and apparatuses can include one or a combination of the following examples:

Example 1 is an apparatus comprising a processor core; a processor memory to cache data; and a platform firmware to determine that a device is connected to the processor core across the memory link interface; determine that the device comprises the attached memory unit; determine a range of at least a portion of the attached memory unit available for the processor core; map the range of the portion of the attached memory unit to the processor memory; and wherein: the processor core is to use the range of the portion of the particular attached memory unit and the processor memory to cache data.

Example 2 may include the subject matter of example 1, further comprising a memory link interface to couple the processor core with the attached memory unit, wherein the memory link interface comprises a link compliant with one of an Intel Accelerator Link (IAL) protocol, a GenZ-based protocol, or a CAPI-based protocol.

Example 3 may include the subject matter of any of examples 1-2, the platform firmware to receive from the attached device a capability register block, and wherein the platform firmware is to determine the range of at least the portion of the attached memory from the capability register block.

Example 4 may include the subject matter of example 3, wherein the capability register block is a Designated Vendor-Specific Extended Capability (DVSEC) register block.

Example 5 may include the subject matter of any of examples 1-4, the platform firmware to construct one or more Advanced Configuration and Power Interface (ACPI) tables with information received from the device or received from an Extensible Firmware Interface (EFI) driver associated with the device.

Example 6 may include the subject matter of example 5, wherein the one or more ACPI tables comprises one or both of a Static Resource Affinity Table (SRAT) or a Heterogeneous Memory Attributes Table (HMAT).

Example 7 may include the subject matter of example 6, wherein the HMAT table comprises a System Locality Latency and Bandwidth Information Structure and a Memory Subsystem Address Range Structure.

Example 8 may include the subject matter of example 7, wherein the System Locality Latency and Bandwidth Information Structure comprises bandwidth and latency information for the attached memory.

Example 9 may include the subject matter of example 7, wherein the Memory Subsystem Address Range Structure comprises a field indicating a system physical address (SPA) base for the attached memory and a length of the attached memory space available to the processor core.

Example 10 may include the subject matter of example 1-8, the platform firmware to determine that the attached memory is not initialized; and cause the attached memory to be initialized.

Example 11 is at least one non-transitory machine accessible storage medium having instructions stored thereon, the instructions when executed on a machine, cause the machine to determine a presence of a device connected to a host processor across a link by a driver associated with the device; determine that the device comprises coherent memory; provide one or more attributes about the coherent memory to the host processor to map the coherent memory to system memory; determine that the coherent memory is not initialized; and initialize the coherent memory for use by the host processor, the host processor to use the coherent memory of the device and the system memory for storing data.

Example 12 may include the subject matter of example 11, wherein the instructions comprise an Extensible Firmware Interface (EFI) driver associated with the device.

Example 13 may include the subject matter of example 12, wherein the instructions cause the machine, when executed, to provide to platform firmware one or more bandwidth or latency attributes of the coherent memory to construct one or more Advanced Configuration and Power Interface (ACPI) tables.

Example 14 may include the subject matter of example 13, wherein the one or more ACPI tables comprise one or more of a Heterogeneous Memory Attributes Table (HMAT) or a nonvolatile dual in-line memory module firmware interface table (NFIT).

Example 15 may include the subject matter of any of examples 11-14, wherein the instructions cause the machine, when executed, to notify platform firmware that the coherent memory is available using a software call defined in an EFI-based initialization protocol.

Example 16 may include the subject matter of any of examples 11-15, wherein the instructions comprise an operating system driver associated with the device.

Example 17 may include the subject matter of example 17, wherein the instructions cause the machine, when executed, to notify platform firmware that the coherent memory is available using one or more device-specific methods determined from the operating system driver.

Example 18 is a system comprising a host processor comprising one or more hardware processor cores; a system memory for caching data; a device connected to the host processor by a link; a coherent memory associated with the device; and platform firmware to discover, at system boot-up, the device; determine one or more attributes of the coherent memory; and map at least a portion of the coherent memory into an address space with the system memory; and the host processor to use the system memory and the coherent memory for caching data.

Example 19 may include the subject matter of example 18, wherein the device comprises an accelerator circuit implemented at least partially in hardware, the accelerator circuit to provide processing acceleration for the host processor.

Example 20 may include the subject matter of example 19, further comprising an accelerator link coupling the accelerator to the host processor.

Example 21 may include the subject matter of example 20, wherein the accelerator link is compliant with one of an Intel Accelerator Link (IAL)-based protocol, a GenZ-based protocol, or a CAPI-based protocol.

Example 22 may include the subject matter of any of examples 18-21, wherein the coherent memory comprises a host-managed device memory (HDM).

Example 23 may include the subject matter of any of examples 18-22, the platform firmware to receive from the device a capability register block that indicates the one or more attributes of the coherent memory; determine from the capability register block a memory size and address range available to the host processor; and map the memory size and address range available to the host processor to an address space with the system memory.

Example 24 may include the subject matter of example 23, the platform firmware to construct one or more Advanced Configuration and Power Interface tables based on the attributes received in the capability register block; and use the one or more ACPI tables to map the memory size and address range to the address space.

Example 25 may include the subject matter of example 18-24, further comprising a device driver associated with the device, the device driver to initialize the coherent memory; and provide one or more Advanced Configuration and Power Interface (ACPI) table data fragments about the coherent memory to the platform firmware to facilitate construction of the one or more ACPI tables.

Example 26 is a method for configuring a coherent memory, the method performed by platform firmware of a host processor, the method comprising determining that a device is connected to the host processor across the memory link interface; determining that the device comprises the attached memory unit; determining a range of at least a portion of the attached memory unit available for the host processor; mapping the range of the portion of the attached memory unit to the processor memory; and wherein the host processor uses the range of the portion of the particular attached memory unit and processor memory to cache data.

Example 27 is an apparatus comprising means for determining that a device is connected to a host processor across the memory link interface; means for determining that the device comprises the attached memory unit; means for determining a range of at least a portion of the attached memory unit available for the host processor; means for mapping the range of the portion of the attached memory unit to the processor memory; and means for causing the host processor to use the range of the portion of the particular attached memory unit and the processor memory to cache data.

What is claimed is:

1. An apparatus comprising:
a system memory;
a host device comprising:
control logic to:
determine that an endpoint device to be connected to the host device across a link supports an accelerator link memory protocol for read and write transactions to a host-managed device memory (HDM);
identify an HDM range to be implemented by the host device;
determine a size of the HDM range; and
map the size of the HDM range to a corresponding system address space in the system memory.

2. The apparatus of claim 1, wherein the control logic is further to determine a number of HDM ranges to be managed by the host device and determine a respective size of each one of the number of HDM ranges.

3. The apparatus of claim 2, wherein the control logic is to determine the number of HDM ranges to be implemented by the host device based on information in a Designated Vendor-Specific Extended Capability (DVSEC) register.

4. The apparatus of claim 3, wherein the control logic is to determine the number of HDM ranges to be implemented by the host device based on bits 5:4 in a DVSEC Flex Bus Capability field of the DVSEC register.

5. The apparatus of claim 1, wherein the control logic is to determine a size of each HDM range based on information in a Designated Vendor-Specific Extended Capability (DVSEC) Flex Bus Range Size field and a DVSEC Flex Bus Range Base field of a DVSEC register.

6. The apparatus of claim 1, wherein the host device is to perform memory transactions with the HDM based on a memory base and memory size of an HDM range.

7. The apparatus of claim 1, wherein the control logic is to map the HDM range to the corresponding system address space as a memory-only non-uniform memory access (NUMA) node.

8. The apparatus of claim 7, wherein the HDM range is exposed as the memory-only NUMA node by an Advanced Configuration and Power Interface (ACPI) Static Resource Affinity Table (SRAT).

9. The apparatus of claim 8, further comprising a unified extensible firmware interface (UEFI) driver to provide latency and bandwidth information for the HDM to the control logic; wherein the control logic is to construct the ACPI SRAT and a Heterogeneous Memory Attributes Table (HMAT) based on the latency and bandwidth information received from the UEFI driver.

10. The apparatus of claim 9, wherein the HMAT comprises HDM range entries, the HDM range entries comprising HDM base, HDM size, HDM latency, and HDM bandwidth.

11. A system comprising:
an endpoint device comprising a host-managed device memory (HDM); and
a host device interconnected to the endpoint device by a link, the host device comprising control logic to:
determine that the endpoint device supports an accelerator link memory protocol for memory transactions to the HDM;
identify an HDM range to be implemented by the host device;
determine a size of the HDM range; and
map the size of the HDM range to a corresponding system address space, wherein the host device is to use the HDM for memory transactions.

12. The system of claim 11, the endpoint device comprises a device-attached memory, and wherein the control logic is to map the device-attached memory to a system coherent address space.

13. The system of claim 11, wherein the control logic is to determine the number of HDM ranges to be implemented by the host device based on information in a Designated Vendor-Specific Extended Capability (DVSEC) register.

14. The system of claim 13, wherein the control logic is to determine the number of HDM ranges to be implemented by the host device based on bits 5:4 in a DVSEC Flex Bus Capability field of the DVSEC register.

15. The system of claim 14, wherein the control logic determines one HDM range if bits 5:4 have a binary value of "01" or two HDM ranges if bits 5:4 have a binary value of "10".

16. The system of claim 11, wherein the control logic is to determine a size of each HDM range based on information in a Designated Vendor-Specific Extended Capability (DVSEC) Flex Bus Range Size field and a DVSEC Flex Bus Range Base field of a DVSEC register.

17. The system of claim 11, wherein the host device is to perform the memory transactions with the HDM based on a memory base and memory size of the HDM range.

18. The system of claim 11, the control logic is to map the HDM range to the corresponding system address space as a memory only non-uniform memory access (NUMA) node.

19. The system of claim 18, wherein the HDM range is exposed as the memory-only NUMA node by an Advanced Configuration and Power Interface (ACPI) Static Resource Affinity Table (SRAT).

20. The system of claim 19, further comprising a unified extensible firmware interface (UEFI) driver to provide latency and bandwidth information for the HDM to the control logic; wherein the control logic is to construct the ACPI SRAT and a Heterogeneous Memory Attributes Table (HMAT) based on the latency and bandwidth information received from the UEFI driver.

21. The system of claim 20, wherein the HMAT comprises HDM range entries, the HDM range entries comprising HDM base, HDM size, HDM latency, and HDM bandwidth.

22. A method comprising:
determining, at a host device, that an endpoint device interconnected to the host device supports an accelerator link memory protocol;
identifying, at the host device, a number of host-managed device memory (HDM) ranges for a memory at the endpoint device;
determining, at the host device, a size of each of the HDM ranges; and mapping the size of each the number of HDM ranges to a system address space.

23. The method of claim 22, further comprising identifying the number of HDM ranges and identifying the size of each of the HDM ranges based on information in a Designated Vendor-Specific Extended Capability (DVSEC) register.

24. The method of claim 22, further comprising mapping the size of each HDM range to the corresponding system address space as a memory-only non-uniform memory access (NUMA) node.

25. The method of claim 24, wherein exposing the HDM range as the memory-only NUMA node by an Advanced Configuration and Power Interface (ACPI) Static Resource Affinity Table (SRAT).

26. The method of claim 25, further comprising:
receiving latency and bandwidth information for the HDM from a unified extensible firmware interface (UEFI) driver; and
constructing the ACPI SRAT and a Heterogeneous Memory Attributes Table (HMAT) based on the latency and bandwidth information received from the UEFI driver.

27. The method of claim 25, wherein the HMAT comprises HDM range entries, the HDM range entries comprising HDM base, HDM size, HDM latency, and HDM bandwidth.

* * * * *